UNITED STATES PATENT OFFICE 2,513,123

PROCESS FOR PREPARING ARYL HALOSILANES

George H. Wagner, Kenmore, N. Y., assignor to The Linde Air Products Company, a corporation of Ohio No Drawing. Application October 10, 1947, Serial No. 779,202

6 Claims. (Cl. 260—448.2)

The invention is a process for the manufacture of aryl halosilanes, in which process an aromatic hydrocarbon is caused to react with a silicon compound containing at least one Si-Si bond in the molecule.

Aryl halosilanes have been prepared in various ways, for example by the Grignard reaction as modified by F. S. Kipping and others; and by various adaptations of the Würtz synthesis. These methods require expensive reagents. The aryl halosilanes have also been prepared by the direct action of aryl halides on silicon, but the yields obtainable in this way are believed to be relatively poor. It has also been stated that hydrocarbons, apparently of all known classes, can be reacted in vapor phase with compounds which contain silicon and halogen to form, among other things, aryl halosilanes. In this latter process a stream of the mixed vapors is heated to at least 450° C., and preferably above 600° C., and no catalyst is used. Compounds containing a plurality of silicon atoms in the molecule are represented to be suitable starting materials, but the products obtained from them are not identified. I have been unable to obtain satisfactory results with the process last referred to.

The process forming the subject matter of the present application requires a silicon compound containing the Si-Si bond, and also requires a sulphur-containing catalyst. The temperatures used are below 600° C., and usually below 450° C., with the reagents preferably at a pressure not less than that generated by the confined vapors at 200° C.

The reaction is effectively catalyzed by a wide variety of sulphur-containing materials. I have used, for example, elemental sulphur, sulphur monochloride, diethyl sulphide, butyl mercaptan, and carbon disulphide. Sulphur monochloride is convenient and quite active. Fairly high catalyst concentrations are desirable. Thus, when 66 grams of benzene was heated with 113 grams of $Si_2Cl_6$ at 350° C. for 14.5 hours in the presence of a quantity of $S_2Cl_2$ equal to 0.05% of the whole charge, the yield of $C_6H_5SiCl_3$ was only 2.7%, and the efficiency (based on the silicon content) 2.8%: when the concentration of $S_2Cl_2$ was increased to 0.50%, other conditions remaining the same, the yield rose to 14.7%, and the efficiency to 15.5%: while with 4.0% of the catalyst, yield and efficiency were both 25.4%. In the above tests, a bomb lined with the alloy known as Monel "K" was used. This metal seems to be especially favorable to the reaction, but other materials, for example stainless steel, can be used.

The reaction is expedited by raising the temperature, but it is usually possible to obtain good yields in moderate periods of time without exceeding 450° C. A processing period of several hours may be required, but this is usually unobjectionable in a commercial operation.

The chief utility of the invention seems to be in the treatment of halogenated derivatives of the disilanes, such as $Si_2Cl_6$ or $Si_2HCl_5$, to make such relatively simple products as $C_6H_5SiCl_3$, but derivatives of trisilanes and their higher homologues can also be used, with corresponding diversity in the products. Derivatives of di- and polysilanes containing other substituent groups, such as alkoxy radicals, with or instead of halogen, are also available. The hydrocarbon may be as simple as benzene, toluene, or xylene, but the process is applicable to aromatic hydrocarbons in general.

The following specific examples will serve further to illustrate the invention:

Example I

A mixture consisting of 66 grams of benzene, 113 grams of hexachlorodisilane, and 8 grams of sulphur monochloride was heated at 350° C. for 16 hours in a 300 cc. autoclave. From the products there were recovered 42 grams of phenyltrichlorosilane, 43 grams of benzene, 6 grams of hexachlorodisilane, and 56 grams of silicon tetrachloride.

Under the same conditions, but with a catalyst consisting of 3 grams of elemental sulphur, the quantity of phenyltrichlorosilane recovered was 39 grams, with 42 grams of benzene, 15 grams of trichlorosilane, and 46 grams of silicon tetrachloride.

Example II

A mixture of 65 grams of toluene, 113 grams of hexachlorodisilane, and 8 grams of sulphur monochloride was heated at 290° C.–350° C. for 24.5 hours in a 300 cc. autoclave. The quantity of tolyltrichlorosilane recovered was 20 grams.

Example III

A mixture of 66 grams of benzene, 75 cc. of pentachlorodisilane, and 8 grams of sulphur monochloride was heated at 350° C. for 16 hours in a 300 cc. autoclave. Phenyltrichlorosilane in the amount of 49 grams was isolated from the products.

What is claimed is:

1. Process of preparing aryl silicon compounds which comprises heating a monocyclic aromatic hydrocarbon with a fully chlorinated disilane, in the presence of sulphur monochloride, and at a pressure not less than their combined vapor pressure at 200° C.

2. Process of preparing phenyltrichlorosilane which comprises heating together benzene, hexachlorodisilane, and sulphur monochloride in an autoclave to a temperature between 200° C. and 450° C.

3. Process of preparing phenyltrichlorosilane which comprises heating together benzene, pentachlorodisilane, and sulphur monochloride in an autoclave to a temperature between 200° C. and 450° C.

4. Process of preparing aryl silicon compounds which comprises heating a monocyclic aromatic hydrocarbon with a member of the group consisting of pentachlorodisilane and hexachlorodisilane, in the presence of a catalyst of the group consisting of elemental sulphur, sulphur monochloride and carbon disulphide, and at a pressure not less than the combined vapor pressure of the reactants at 200° C.

5. Process of preparing aryl silicon compounds which comprises heating a monocyclic aromatic hydrocarbon with a member of the group consisting of pentachlorodisilane and hexachlorodisilane, in the presence of elemental sulphur, and at a pressure not less than the combined vapor pressure of the reactants at 200° C.

6. Process of preparing aryl silicon compounds which comprises heating a monocyclic aromatic hydrocarbon with a member of the group consisting of pentachlorodisilane and hexachlorodisilane, in the presence of carbon disulphide, and at a pressure not less than the combined vapor pressure of the reactants at 200° C.

GEORGE H. WAGNER.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,407,181 | Scott | Sept. 3, 1946 |
| 2,474,087 | Barry | June 21, 1949 |